United States Patent
Westphal

(10) Patent No.: US 9,298,669 B2
(45) Date of Patent: Mar. 29, 2016

(54) SYSTEMS AND METHODS FOR SYNCHRONIZING CONTENT TABLES BETWEEN ROUTERS

(71) Applicant: FutureWei Technologies, Inc., Plano, TX (US)

(72) Inventor: Cedric Westphal, San Francisco, CA (US)

(73) Assignee: Futurewei Technologies, Inc., Plano, TX (US)

(*) Notice: Subject to any disclaimer, the term of this patent is extended or adjusted under 35 U.S.C. 154(b) by 427 days.

(21) Appl. No.: 13/862,215

(22) Filed: Apr. 12, 2013

(65) Prior Publication Data

US 2013/0275544 A1 Oct. 17, 2013

Related U.S. Application Data

(60) Provisional application No. 61/623,998, filed on Apr. 13, 2012.

(51) Int. Cl.
*G06F 15/173* (2006.01)
*G06F 15/167* (2006.01)
*H04L 12/751* (2013.01)

(52) U.S. Cl.
CPC ............. *G06F 15/167* (2013.01); *H04L 45/02* (2013.01)

(58) Field of Classification Search
CPC ............ H04L 41/08–41/0896; H04L 67/1095; H04L 45/02–45/021; H04L 45/306; H04L 29/08972; H04L 67/327; G06F 17/30129–17/30162
See application file for complete search history.

(56) References Cited

U.S. PATENT DOCUMENTS

| | | | |
|---|---|---|---|
| 7,808,927 B2 | 10/2010 | Retana et al. | |
| 2004/0246902 A1 | 12/2004 | Weinstein et al. | |
| 2007/0127457 A1 | 6/2007 | Mirtorabi et al. | |
| 2009/0310586 A1 | 12/2009 | Shatti | |
| 2010/0238811 A1 | 9/2010 | Rune | |
| 2013/0194964 A1* | 8/2013 | Basso et al. | 370/254 |
| 2014/0173137 A1* | 6/2014 | Jacobson et al. | 709/248 |

OTHER PUBLICATIONS

International Search Report and Written Opinion of the International Searching Authority received in Patent Cooperation Treaty Application No. PCT/US13/36483, mailed Aug. 15, 2013, 8 pages.
Xiong, Z., et al., "Distributed Source Coding for Sensor Networks," IEEE Signal Processing Magazine, Sep. 2004, vol. 21, Issue 5, pp. 80-94.
Bloom, B., "Space/Time Trade-offs in Hash Coding with Allowable Errors," Communications of the ACM, Jul. 1970, vol. 13, No. 7, pp. 422-426.

(Continued)

*Primary Examiner* — Brendan Higa
(74) *Attorney, Agent, or Firm* — Slater & Matsil, L.L.P.

(57) ABSTRACT

System and method embodiments for exchanging information between a first and second content router enable the content routers to synchronize their caches with a minimal exchange of information. In an embodiment, the method includes creating a hash of contents of a cache in the first content router using a joint hash function shared with the second content router, encoding the hash of contents of the cache in the first content router with distributed source coding, and transmitting the encoded hash to the second content router.

18 Claims, 3 Drawing Sheets

(56) References Cited

OTHER PUBLICATIONS

Slepian, D., et al., "Noiseless Coding of Correlated Information Sources," IEEE Transactions on Information Theory, Jul. 1973, vol. 19, Issue 4, pp. 471-480.

Michel, S., et al., "Adaptive web caching: towards a new global caching architecture," Computer Networks and ISDN Systems, Nov. 1998, vol. 30, Issues 22-23, 9 pages.

Fan, L., et al., "Summary Cache: A Scalable Wide-Area Web Cache Sharing Protocol," IEEE/ACM Transactions on Networking (TON), Jun. 2000, vol. 8, Issue 3, 12 pages.

Agarwal, S., et al., "On the Scalability of Data Synchronization Protocols for PDAs and Mobile Devices," IEEE Network, Jul./Aug. 2002, vol. 16, Issue 4, 14 pages.

Pradhan, S., et al., "Distributed Source Coding Using Syndromes (DISCUS): Design and Construction,", IEEE Transactions on Information Theory, Mar. 2003, vol. 49, Issue 3, 10 pages.

Minsky, Y., et al., "Set Reconciliation with Nearly Optimal Communication Complexity," IEEE Transactions on Information Theory, Sep. 2003, vol. 49, Issue 9, 18 pages.

Koponen, T., et al., "A Data-Oriented (and Beyond) Network Architecture," Proceedings of the 2007 conference on Applications, technologies, architectures, and protocols for computer communications, 2007. 12 pages.

Jerzak, Z., et al. "Bloom Filter Based Routing for Content-Based Publish/Subscribe," DEBS '08 Proceedings of the second international conference on Distributed event-based systems, 2008, 11 pages.

Jacobson, V., et al., "Networking Named Content," Proceedings of the $5^{th}$ international conference on Emerging networking experiments and technologies, Oct. 13, 2009, pp. 1-12, New York, NY.

Trossen, D., et al., "Public Review for Arguments for an Information-Centric Internetworking Architecture," ACM SIGCOMM Computer Communication Review, Apr. 2010, vol. 40, No. 2, 8 pages.

Eppstein, D., et al., "What's the Difference? Efficient Set Reconciliation without Prior Context," SIGCOMM '11, Aug. 15-19, 2011, pp. 218-229, Toronto, Ontario, Canada.

Ghodsi, A., et al., "Information-Centric Networking: Seeing the Forest for the Trees," Hotnets '11, Nov. 14-15, 2011, pp. 1-6, Cambridge, MA.

Field, B., et al., "Integrating Routing with Content Delivery Networks," IEEE Conference on Computer Communications Workshops (INFOCOM WKSHPS) Mar. 25-30, 2012, 6 pages.

International Search Report and Written Opinion of the International Searching Authority received in Patent Cooperation Treaty Application No. PCT/US2013/36483, mailed Aug. 15, 2013, 8 pages.

* cited by examiner

SYSTEMS AND METHODS FOR SYNCHRONIZING CONTENT TABLES BETWEEN ROUTERS

CROSS-REFERENCE TO RELATED APPLICATIONS

The present application claims the benefit of U.S. Provisional Patent Application No. 61/623,998 filed Apr. 13, 2012 entitled "A Method for Synchronizing Content Table in Between Content Routers" which is incorporated herein by reference as if reproduced in its entirety.

TECHNICAL FIELD

The present invention relates to systems and methods for exchanging forwarding table information between content routers.

BACKGROUND

Information-Centric Networks (ICNs) place the content as the narrow waist of the networking architecture, and perform routing based upon the content and not based upon node addresses as in Internet protocol (IP) networks. These ICN architectures also allow for the routers to transparently store content in a memory attached to the router.

Both routing on content, and the multiplication of potential locations for the stored content enabled by ICNs, make the routing more challenging in ICNs. While a typical router today while contain about 400,000 prefix entries in its route table, content routing increases this amount by several order of magnitudes. Thus, new tools and protocols to exchange routing information in a scalable and efficient manner are desirable.

SUMMARY OF THE INVENTION

In accordance with an embodiment, a method for exchanging information between a first and second content router includes creating a hash of contents of a cache in the first content router using a joint hash function shared with the second content router, encoding the hash of contents of the cache in the first content router with distributed source coding, and transmitting the encoded hash to the second content router.

In accordance with another embodiment, a network component configured for exchanging information between a first and second content router includes a processor and a computer readable storage medium storing programming for execution by the processor, the programming including instructions to: create a hash of contents of a cache in the first content router using a joint hash function shared with the second content router, encode the hash of contents of the cache in the first content router with distributed source coding, and transmit the encoded hash to the second content router.

In accordance with another embodiment, a method for exchanging information between content routers includes creating a hash of entries of a cache in a first content router, encoding the hash of the entries with distributed source coding, and transmitting the encoded hash to a second content router, wherein the encoded has comprises a coset of elements that belong to both the first content router and a second content router such that the second content router may recover elements of the coset that are not contained in a cache of the second content router from the encoded hash.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
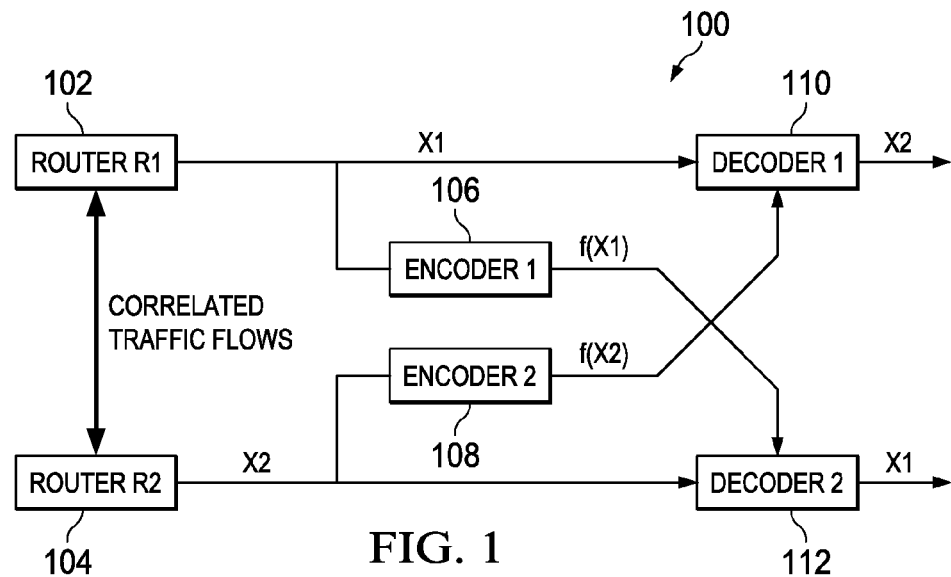
FIG. 1 is a schematic diagram illustrating an embodiment system for exchanging information between two content routers.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for exchanging cache information in between routers in an ICN network and other similar networks. For example, in an embodiment, the network is a content distribution network (CDN) with a hierarchical structure where requests for content at a lower level cache are propagated up if not available locally. In other embodiments, the network may be a content oriented network (CON) or a content centric network (CCN). Thus, although described primarily with reference to ICN, those of ordinary skill in the art will recognize the disclosed systems and methods are not so limited.

In an embodiment, systems and methods for exchanging information in between neighboring routers are disclosed. As the amount of content in a content table may become very large, finding an efficient mechanism to exchange caching information and update content across different tables becomes more important. In an embodiment, the disclosed systems and methods take into account the fact that the content on both sides is strongly correlated. Indeed, the traffic going through neighboring caches might go through both content routers, or if it only traverses one of the two, the content itself exhibit some correlation: popular content in one cache exhibit similarity with the popular content in another cache.

In an embodiment, joint hashing and distributed source coding are used to exchange content between two content routers. Other approaches that exchange an amount of data proportional to the difference in between the two objects are usually probabilistic.

In an embodiment, a method for exchanging cache information between neighboring content routers checks the content at some fixed interval, where the interval is triggered by the amount of change in the content table and uses distributed source coding to efficiently share the content updates. In an embodiment, it is assumed that the two neighboring content routers need to exchange a content table of large size in order to populate their own routing information. The disclosed systems and methods provide a mechanism for exchanging a substantially minimal amount of data in between the two routers while allowing them to reconstruct the exact content of the route table.

Although a simple answer for exchanging cache content between the two content routers is to exchange the whole content table. However, since the routers are neighbors, they have a very similar view of the network, and a lot of the information they share is redundant.

Compressing the content table is possible. However, there are three categories of content to consider in the content entries: 1) the content that is shared by both table and thus is redundant and could be compressed away using some compression technique; 2) the content that one of the content routers might be aware of, but not have an entry in the route table; 3) the content that one of the routers has no prior knowledge about whatsoever.

To illustrate the three categories, consider the following examples. In one example, some content information is propagated by a content routing protocol to both routers. This content would fall in category 1). Both content routers are aware of the content.

In category 2), some content information is generated by the traffic going through the network. For instance, the content router might cache an object in its content store before forwarding the content. If this piece of content is received by the same content router with which to share the content table, then there is a strong likelihood that this piece of content will be included in its content routing table. It is not 100% sure, as the caching policies will differ at both routers, and as this information might be timed-out. However, both routers have some idea that the information could or could not be there. This would fall in category 2). Again, this could be used to compress the exchange, as in a distributed source coding with side information problem.

In category 3), on the other hand, corresponds to content that goes through, and is cached by one router, but never reaches its neighbor (e.g., because one of the routers is the destination; or because one router receives it from and sends it to a third and fourth routers). This information has to be conveyed and, outside of compressing the text strings in these entries, there is no way around exchanging this information.

Because of the 3rd category, the distributed source coding or Slepian-Wolf approach is not directly applicable. In an embodiment, a method controls the amount of change in a table, and uses this to efficiently exchange content routes. For example, assume that both content tables at time t are synchronized, i.e. both content routers have exchanged the routing information they wanted to and all content entries are in category 1). After synchronization, the system evolves until the earliest of two triggers occurs. The triggers are a) the natural periodic exchange mechanism of the content routing protocol; and b) the number of changes in a route table (either by removal or additions) reaches a pre-set target d, where d is the number of changes that will trigger an update. When this stopping time occurs at time t1, a new exchange mechanism is triggered. This means that the differences between the content tables at time t and t1 cannot vary more than by d items. In an embodiment, disclosed is a mechanism to exchange the route tables in a compact manner which can recover up to d differences exactly.

FIG. 1 is a schematic diagram illustrating an embodiment system 100 for exchanging information between two content routers. In an embodiment, system 100 includes two content routers 102, 104, two encoders 106, 108, and two decoders 110, 112. Routers 102, 104 have correlated traffic flows. Each content router 102, 104 is configured to hash the contents of its content forwarding table cache, compress the hash using the respective encoder 106, 108 and transmit the encoded data to the other content router 102, 104. The other content router 102, 104 may decode the encoded data using the respective decoder 110, 112 and request missing or different cache elements from the other content router 102, 104.

Thus, for example, the two content routers R1 and R2 try to reconcile their content route tables. Consider a vector U corresponding to all potential entries seen both by R1 and R2 namely the union set of the entries held by R1 and R2. An entry is the name of the content and some metric to the content, so that each router can then decide which way to route to the content (namely for R1, if R2 holds an entry unknown to R1 or one with a lower metric, then R2 becomes the next hop for this entry in the content forwarding table of R1). It can be assumed that the concatenation of the content pointer and the metric value forms the set of labels from which the content of U is drawn. The vector of entries being held at R1 are denoted by U1 and the vector of entries being held at R2 are denoted by U2.

Denote by n1, n2 the cardinality of U1, U2, by n that of U and by d1 (resp d2) the difference n−n1 (resp. n−n2), where n is defined as the cardinality of u, namely, the size of the list that includes all items seen at either router. n can be viewed as the length of vector U. Assume d<d1+d2 and d<<n, e.g., d is an order of magnitude smaller than n.

Define a uniform hash h from U to $\{1, 2, \ldots, m\}$, where m is a number larger than n to be specified later and u is an item on the list U. Create a vector Xi (for i=1,2) of dimension m in the following manner, for k=1, ..., m:

$$X\_i(k) = 1 \text{ if there exists } u \text{ in U\_i such that } h(u) = k$$
$$= 0 \text{ otherwise.}$$

Figure 2:
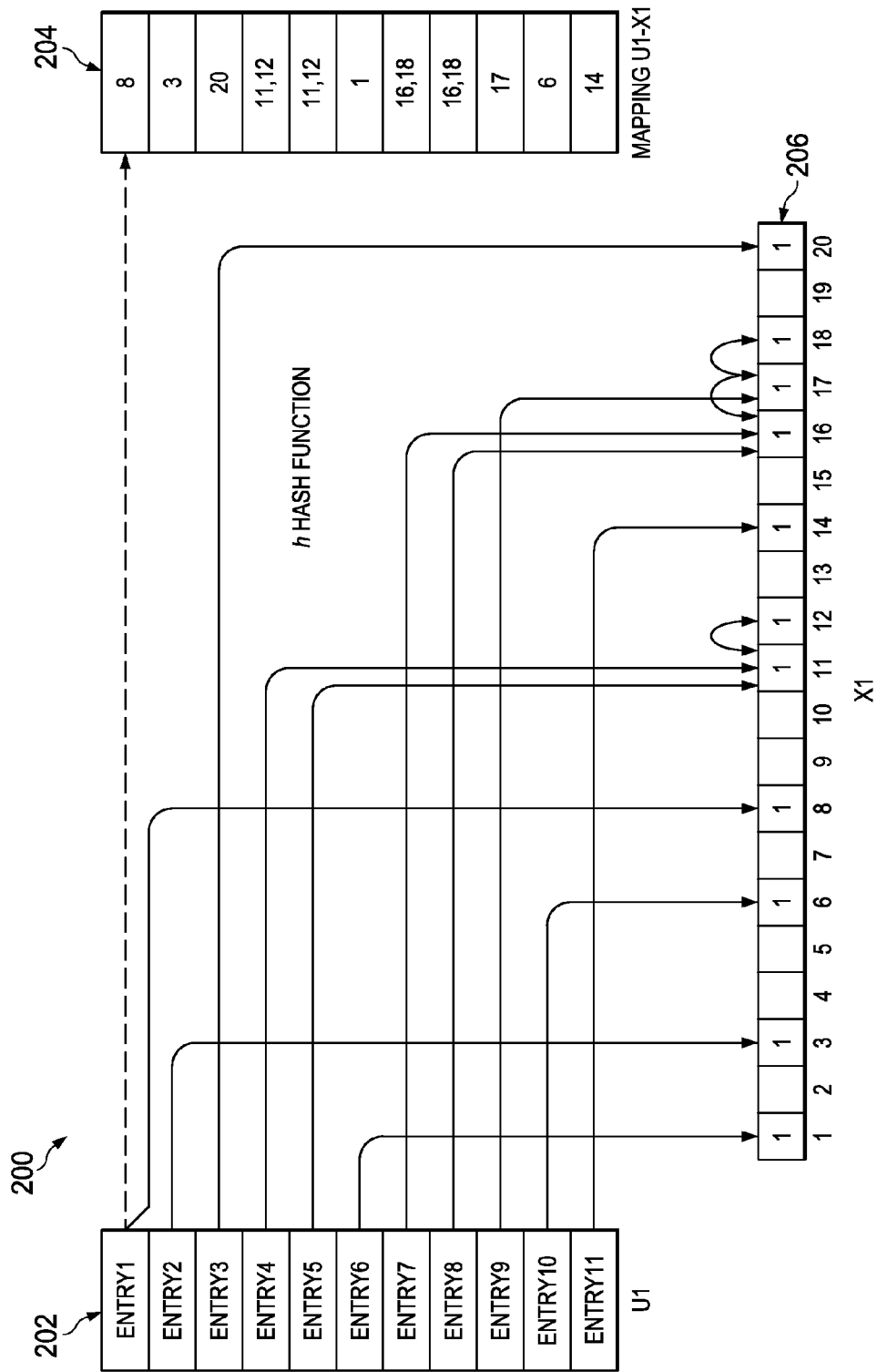
FIG. 2, which is a schematic diagram of an embodiment system of hashing and mapping the entries of a content router's cache for exchanging information with another content router.

Since U1 and U2 differ in only fewer than d spots, the vectors X1 and X2 are two highly correlated sequences. Exchanging X1 and X2 allows in a fast manner to identify the differences between U1 and U2, as long as the probability of a collision is kept low. See FIG. 2, which is a schematic diagram of an embodiment system 200 of hashing and mapping the entries of a content router's cache for exchanging information with another content router. The system 200 comprises a plurality of entries 202 in a content router cache, the hash values 206 produced by applying a hash function, h, to the entries, and a mapping 204 to help eliminate collisions in the hash.

To exchange X1 and X2 in a concise manner, an embodiment makes use of distributed source coding. The key result, due to Slepian and Wolf, is that R1 only needs to transmit H(X1|X2) bits to R2 for R2 to be able to recover X1(where H(X_1|X_2) is the entropy of X1 conditioned on X2). This is achieved in practice using method such as the one described in S. S. Pradhan and K. Ramchandran, "Distributed source coding using syndromes (DISCUS): design and construction," pp. 158-167, March, 1999, which is incorporated herein by reference in its entirety. In the case of no collision, the Hamming distance between X1 and X2 is less than d. R1 needs only to send R2 the coset to which X1 belongs to and R2 can retrieve from this coset the element nearest X2 in this coset (the cosets are the partition of the space such that elements in each coset have Hamming distance greater than d).

Note, the Hamming distance between two strings equal length is the number of positions at which the corresponding symbols are different.

Upon recovering X1, R2 can thus identify all the differences and request from U1 the actual entries of the d1 values it does not have. Similarly, R1 requests the entries from R2.

Referring again to FIG. 1, the basic idea of our cache update protocol thus works in two phases: in a first phase, create the hash, compress it using distributed source coding and exchange coset information between R1 and R2; then decode and request the missing or different elements. To decode, one should invert the mapping from Xi to Ui, which was stored during the creation of Xi.

In an embodiment, m is further characterized and the issue of collisions in the hash h is addressed. In the following, m is discussed and a collision handling mechanism is described. When R1 creates X1, it goes through U1 and hash each entry into a coordinate of X1 which it then flips to 1. This is similar to a Bloom filter with a single hash function B. H. Bloom, "Space/time trade-offs in hash coding with allowable errors," Commun. ACM, vol. 13, pp. 422-426, July 1970, which is incorporated herein in its entirety by reference. However, the following modification can be performed: if the entry in X1 is already equal to 1, then flip the next entry (modulo m) in X1.

As R1 keeps a structure which associates each u in U1 with its key h(u), h(u)+1 is kept in this structure when h(u) has already been claimed previously by u' in U1 such that h(u)=h(u'). A link is also kept between the two entries u and u' which map to the same h(u). If R2 requests either one of the entries corresponding to h(u) or h(u)+1 in X1, then both u and u' should be returned. R2 then figures out which one (if any) it possesses, and which one it does not. If h(u)+1 is not available, then the next zero element of X1 is flipped. Since X1 is sparse, there is no risk of triggering a chain of events that never terminates. If more than two values collide, then all the colliding values are linked together and returned upon request from R2 for any one of them. If later on, while filling X1, another value v hashes to where u has been placed, then v bumps u and the map between entry and key is updated at R1.

Entering a value at the next empty coordinate in X1 is easy, as, in an embodiment, m is selected such that it is much larger than n, to reduce the probability of collision and to ensure that X1 is sparse. For example, in an embodiment, m is an order of magnitude larger than n.

Using this mechanism, the hash used by each R1 and R2 becomes collision-free: there is exactly one flipped entry in Xi for each value in Ui.

The only collision that cannot be resolved is as follows: assume some element u is in U1\U2 and v is in U2\U1 and that these two collides: h(u)=h(v). Because it is in the set difference between U1 and U2, it is unknown to R1 and R2. The chance of such collision however is very low: take m large enough to reduce the chance of collision, and the set differences between U1 and U2 are also limited, since it is assumed that d<<n, e.g., d is an order of magnitude less than n. As such, the probability of a collision becomes the product of the already low hash collision probability multiplied by the probability that both colliding elements belong to the set differences.

Figure 3:
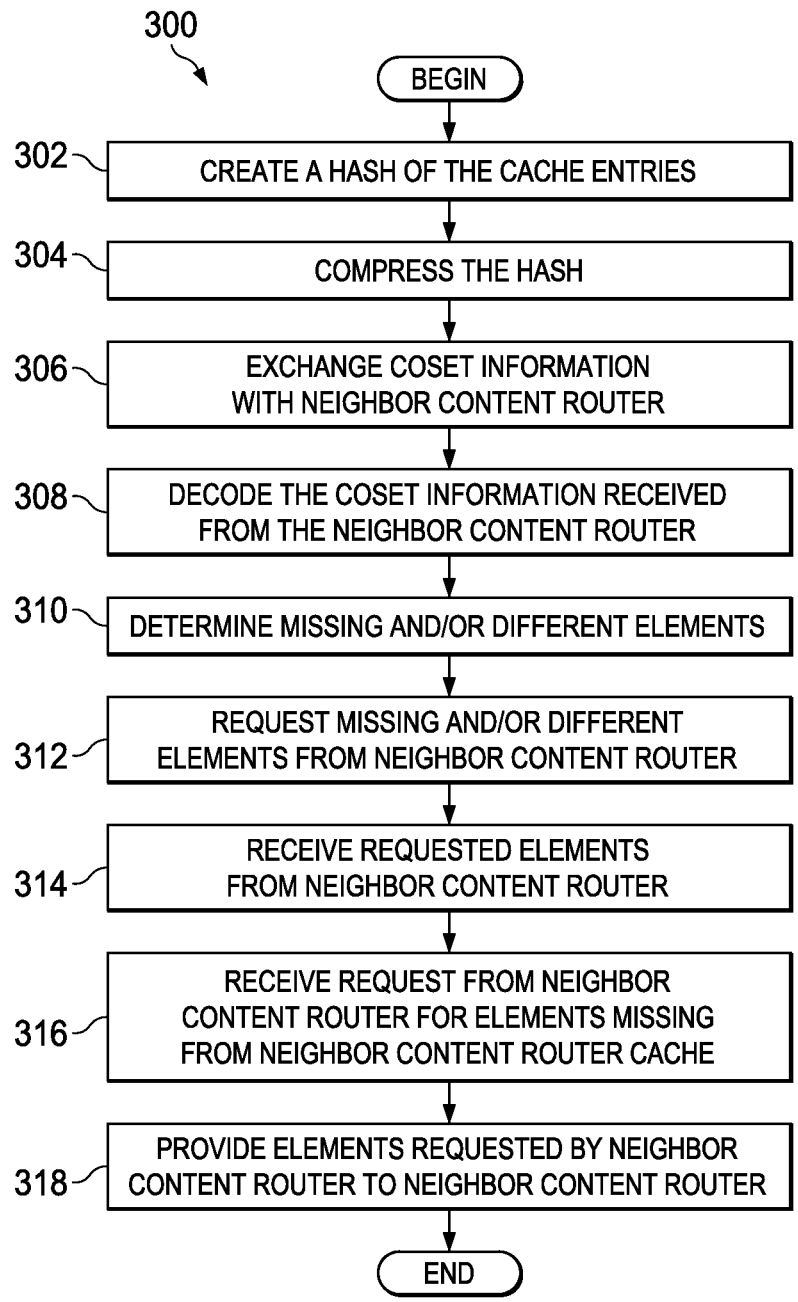
FIG. 3 is a flowchart illustrating an embodiment method for exchanging cache information between content routers.

FIG. 3 is a flowchart illustrating an embodiment method 300 for exchanging cache information between content routers. The method 300 begins at block 302 where the content router creates a hash of the cache entries for its content tables. At block 304, the content router compresses the hash using, for example, distributed source coding. At block 306, the content router exchanges coset information with a neighbor content router. At block 308, the content router decodes the coset information received from the neighbor content router and, at block 310, determines missing and/or different elements. At block 312, the content router requests the missing and/or different elements from the neighbor content router. AT block 314, the content router receives the requested elements from the neighbor content router and updates its cache of content tables accordingly. At block 316, the content router receives a request from the neighbor content router for elements that are missing from or different from the cache of the neighbor content router. At block 318, the content router provides the elements requested by the neighbor content router to the neighbor content router, after which, the method 300 ends.

Figure 4:
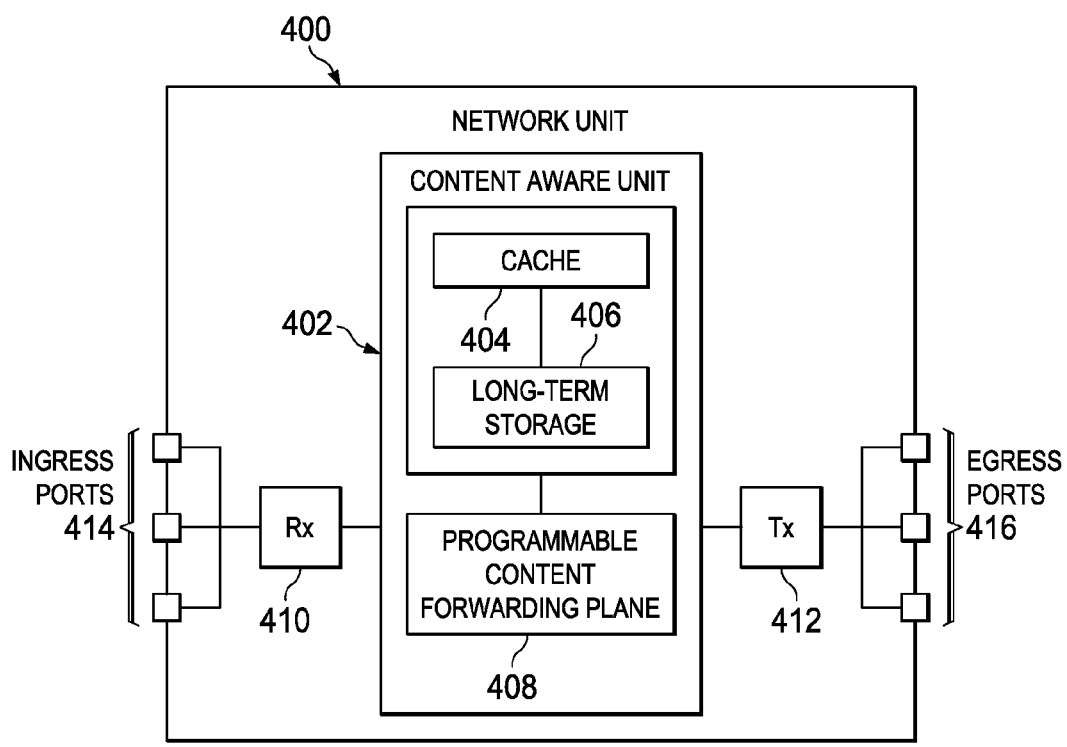
FIG. 4 is a block diagram of a network unit that may be used for implementing the devices and methods disclosed herein.

FIG. 4 is a block diagram of a network unit that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. For instance, the features/methods of the disclosure may be implemented using hardware, firmware, and/or software installed to run on hardware. The network unit 400 may be any device that transports frames through a network, e.g., a switch, router, bridge, server, etc. In an embodiment, the network unit 400 comprises one or more ingress ports 414 or units coupled to a receiver (Rx) 410 for receiving signals and frames/data from other network components. The network apparatus/component 400 comprises a content aware unit 402 to determine which network components to send content to. The content aware unit 402 may be implemented using hardware, software, or both. The network unit 400 also comprises one or more egress ports 416 or units coupled to a transmitter (Tx) 412 for transmitting signals and frames/data to the other network components. The receiver 410, content aware unit 402, and transmitter 412 may also be configured to implement at least some of the disclosed methods, which may be based on hardware, software, or both.4180

The content aware unit 402 also comprises a programmable content forwarding plane block 408 and one or more storage blocks 418 that is coupled to the programmable content forwarding plane block. The programmable content forwarding plane block 408 is configured to implement content forwarding and processing functions, such as at an application layer or L3, where the content may be forwarded based on content name or prefix and possibly other content related information that maps the content to network traffic. Such mapping information may be maintained in a content table at the content aware unit 402 or the network unit 400. The programmable content forwarding plane block 408 is configured to interpret user requests for content and accordingly fetch content, e.g., based on metadata and/or content name, from the network or other content routers and may store the content, e.g., temporarily, in the storage blocks 418. The programmable content forwarding plane block 408 may then forward the cached content to the user. The programmable content forwarding plane block 408 may be implemented using software, hardware, or both and may operate above the IP layer or L2. The storage blocks 418 comprise a cache 404 for temporarily storing content, such as content that is requested by a subscriber. Additionally, the storage blocks 418 comprise a long-term storage 406 for storing content relatively longer, such as content submitted by a publisher. For instance, the cache 404 and the long-term storage 406 may include Dynamic random-access memories (DRAMs), solid-state drives (SSDs), hard disks, or combinations thereof.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for exchanging information between a first and second content router, the method comprising:
   creating a hash of contents of a cache in the first content router using a joint hash function shared with the second content router;
   encoding the hash of contents of the cache in the first content router with distributed source coding; and
   transmitting the encoded hash to the second content router, wherein the encoded hash comprises a coset of a vector X1, wherein X1(k) is a vector of dimension m for k=1 to m, wherein X1(k)=1 if there exists u in U1 such that h(u)=k and X1(k)=0 otherwise, where h(u) is the joint hash function of hashed entry u in the cache of the first content router, where U1 is a vector of the hashed entries in the cache of the first content router.

2. The method of claim 1, further comprising:
   receiving a second encoded hash from the second content router; and
   determining differences between the cache of the first content router and the cache of the second content router; and
   requesting elements from the second content router that are missing from the cache of the first content router or that are different from entries in the cache of the first content router.

3. The method of claim 2, further comprising receiving requested elements from the second content router.

4. The method of claim 2, wherein the second encoded hash comprises a coset of a vector X2, wherein X2(k) is a vector of dimension m for k=1 to m, wherein X2(k)=1 if there exists u in U2 such that h(u)=k and X2(k)=0 otherwise, where h(u) is the joint hash function of hashed entry u in the cache of the second content router, where U2 is a vector of the hashed entries in the cache of the second content router.

5. The method of claim 1, further comprising receiving a request for missing or different cache elements from the second content router and providing the requested missing or different cache elements to the second content router.

6. The method of claim 1, further comprising maintaining a mapping of entries in U1 with its associated key h(u).

7. The method of claim 6, further comprising determining which of multiple entries corresponding to h(u) in the mapping that the first content router does not contain and requesting the one of the multiple entries that the first content router does not contain.

8. The method of claim 1, wherein m is selected such that m is much larger than n, where n is a number of entries in the cache of the first content router.

9. A network component configured for exchanging information between a first and second content router, comprising:
   a processor; and
   a computer readable storage medium storing programming for execution by the processor, the programming including instructions to:
   create a hash of contents of a cache in the first content router using a joint hash function shared with the second content router;
   encode the hash of contents of the cache in the first content router with distributed source coding, wherein the encoded hash comprises a coset of a vector X1, wherein X1(k) is a vector of dimension m for k=1 to m, wherein X1(k)=1 if there exists u in U1 such that h(u)=k and X1(k)=0 otherwise, where h(u) is the joint hash function of hashed entry u in the cache of the first content router, where U1 is a vector of the hashed entries in the cache of the first content router; and
   transmit the encoded hash to the second content router.

10. The network component of claim 9, wherein the programming further comprises instructions to:
    receive a second encoded hash from the second content router; and
    determine differences between the cache of the first content router and the cache of the second content router; and
    request elements from the second content router that are missing from the cache of the first content router or that are different from entries in the cache of the first content router.

11. The network component of claim 10, wherein the programming further comprises instructions to receive the requested elements from the second content router.

12. The network component of claim 10, wherein the second encoded hash comprises a coset of a vector X2, wherein X2(k) is a vector of dimension m for k=1 to m, wherein X2(k)=1 if there exists u in U2 such that h(u)=k and X2(k)=0 otherwise, where h(u) is the joint hash function of hashed entry u in the cache of the second content router, where U2 is a vector of the hashed entries in the cache of the second content router.

13. The network component of claim 9, wherein the programming further comprises instructions to receive a request for missing or different cache elements from the second content router and provide the requested missing or different cache elements to the second content router.

14. The network component of claim 9, wherein the programming further comprises instructions to maintain a mapping of entries in U1 with its associated key h(u).

15. The network component of claim 14, wherein the programming further comprises instructions to determine which of multiple entries corresponding to h(u) in the mapping that the first content router does not contain and requesting the one of the multiple entries that the first content router does not contain.

16. The network component of claim 9, wherein m is selected such that m is much larger than n, where n is a number of entries in the cache of the first content router.

17. A method for exchanging information between content routers, the method comprising:
    creating a hash of entries of a cache in a first content router;
    encoding the hash of the entries with distributed source coding, wherein the encoded hash comprises a coset of a vector X1, wherein X1(k) is a vector of dimension m for k=1 to m, wherein X1(k)=1 if there exists u in U1 such that h(u)=k and X1(k)=0 otherwise, where h(u) is the joint hash function of hashed entry u in the cache of the first content router, where U1 is a vector of the hashed entries in the cache of the first content router; and transmitting the encoded hash to a second content router, wherein the encoded hash comprises a coset of elements that belong to both the first content router and a second content router such that the second content router may recover elements of the coset that are not contained in a cache of the second content router from the encoded hash.

18. The method of claim 17, further comprising:

receiving a second encoded hash from the second content router; and determining missing elements that contained in the cache of the second content router that are not contained in the cache of the first content router; and requesting the missing elements from the second content router.

* * * * *